United States Patent [19]

Kistrup et al.

[11] Patent Number: 5,156,899

[45] Date of Patent: Oct. 20, 1992

[54] FIBER STRUCTURE ELECTRODE PLAQUE FOR INCREASED-CAPACITY VOLTAGE ACCUMULATORS

[75] Inventors: Holger Kistrup, Esslingen; Otwin Imhof, Nürtingen, both of Fed. Rep. of Germany

[73] Assignee: Deutsche Automobilgesellschaft mbH, Fed. Rep. of Germany

[21] Appl. No.: 648,228

[22] Filed: Feb. 1, 1991

[30] Foreign Application Priority Data

Feb. 10, 1990 [DE] Fed. Rep. of Germany ....... 4004106

[51] Int. Cl.$^5$ ................ D04H 1/46; D04H 1/48; H01M 4/72; H01M 4/80
[52] U.S. Cl. ................................ 428/119; 28/112; 428/219; 428/220; 428/288; 428/338; 428/339; 428/361; 428/401; 429/234; 429/235; 429/245
[58] Field of Search ............... 28/112; 428/119, 219, 428/288, 338, 361, 401, 220; 429/234, 235, 245

[56] References Cited

U.S. PATENT DOCUMENTS 4,687,719 8/1987 Benda et al. ................ 429/236
4,835,015 5/1989 Kistrup et al. ................ 427/306
4,925,706 5/1990 Kistrup et al. ................ 427/306

FOREIGN PATENT DOCUMENTS 3318629 10/1984 Fed. Rep. of Germany .
3631055 5/1987 Fed. Rep. of Germany .
3637130 9/1987 Fed. Rep. of Germany .
3710895 9/1987 Fed. Rep. of Germany .

Primary Examiner—James C. Cannon
Attorney, Agent, or Firm—Evenson, Wands, Edwards, Lenahan, & McKeown

[57] ABSTRACT

A fiber structure electrode plaque for accumulators made from a needle felt web made of synthetic fibers which, after activation, is chemically metallized, and galvanically reinforced by being metal-plated. The needle felt web has a weight per unit area of between 50 and 150 g/m$^2$, with a porosity of from 60 to 96%, the synthetic fibers having a diameter of from 10 to 30 μm, and the length of the staple fibers amounting to from 20 to 40 mm. Over its whole surface, the needle felt web is needled from both sides and has a nominal thickness of from 0.5 to 1.0 mm.

2 Claims, 1 Drawing Sheet

FIBER STRUCTURE ELECTRODE PLAQUE FOR INCREASED-CAPACITY VOLTAGE ACCUMULATORS

BACKGROUND AND SUMMARY OF THE INVENTION

The invention relates to a fiber structure electrode plaque for increased-capacity voltage accumulators, comprising a needle felt web made of synthetic fibers which, after activation, is chemically metallized, and is reinforced by metal plating.

Today, as in the past, there is a constantly increasing demand for a mobile decentralized power supply. In this context, accumulators (batteries and other accumulators) are the leading suppliers of an electric energy that is not bound to any location and is available for a limited time. The most wide-spread accumulators are probably those that are equipped with an aqueous electrolyte; for example, with an acidic electrolyte, as in lead accumulators; or with an alkaline electrolyte, as in nickel cadmium cells, nickel hydrogen cells, nickel iron cells or nickel zinc cells. Accumulators which are equipped with an organic electrolyte, a melting electrolyte or a solid electrolyte are also gaining in importance.

The efficiency of an accumulator depends essentially on two factors, specifically the loading capacity of the electrodes and the maintaining of the capacity of the accumulator. In addition, other aspects are becoming increasingly important today, such as the prices of the requisite metal on the world market, or questions concerning the recycling of the used-up accumulators.

In practice, a compromise must frequently be made relative to a particular usage, between the loading capacity of the electrodes and the maintaining of the capacity of the accumulator; i.e., the construction of the electrodes must be adapted to the intended function. Applied to individual battery systems, this means that, for example, for accumulators with lead/lead dioxide electrodes or for accumulators with nickel cadmium electrodes, very specific types of electrodes were developed for the respective usage of the storage cell. Types of electrodes that should be mentioned are: large-surface plates, grid plates, tubular plates, ironclad plates or also self-baking electrodes.

Recently, attempts have been made to use, independently of the particular battery system, a uniform carrier plaque for the electrodes. For this purpose suitable porous synthetic materials have been used, such as foamed materials, nonwoven fabrics or needle felts for the carrier plaque. In the manufacture of the carrier plaque, the synthetic substrate is first activated by means of noble-metal-containing compounds, for example, on a palladium tin base. The thus pretreated surface of the synthetic substrate is then chemically metallized, and the formed metal layer may be reinforced by plating with another metal layer. In this manner, electrode plaques are obtained that have a uniform structure, in particular a porous synthetic substrate which is coated with an appropriately selected metal layer. In this case, the correspondingly selected thickness of the synthetic substrate determines the volume-related capacity of the later existing electrode. The selection of the metal layers deposited on the synthetic surface is determined by the intended use in a specific battery system. The thickness of the metal coating applied to the synthetic surface ultimately determines the capability of the electrode plaque to ensure, during use of the accumulator, current transport from the electrode plaque to the active mass with a higher or lower electric resistance.

The manufacturing of carrier plaques of this type for fiber structure electrodes today is part of the state of the art, such as is disclosed, for example, in the German Patent Documents 33 18 629; 36 37 130; 36 31 055 and 37 10 895. In order to assure efficient functioning of the electrodes in such devices, it is necessary that a sufficiently high porosity be maintained in the electrode plaques. When this requirement is observed, however, in the case of needle felts, the nominal thickness can be reduced only to approximately 1.5 mm, thus resulting in a reduction of the electric capacity of the electrodes which are so equipped. Although high-capacity constructions for electrodes that are offered as alternatives, such as self-baking electrodes, have clear advantages with respect to their loading capacity, they are much more expensive to manufacture.

It is therefore an object of the present invention to provide an electrode plaque made of synthetic fibers, in which the low-cost availability of the highly porous carrier material, and its easy processing into electrode plaques are utilized.

Another object of the invention is to provide such an electrode plaque which achieves increased electric loading capacity of an accumulator equipped therewith.

These and other objects are achieved according to the invention by means of a fiber structure electrode plaque fabricated from needle felt web having characteristic numbers according to the invention as indicated below, and in which the needle felt web is needled from both sides over its whole surface and has a nominal thickness of only 0.5 to 1.0 mm. In such electrode plaques the strong forces of expansion which occur during the cycle operation of the electrode due to the volume work of the active mass can still be absorbed because of the increased mechanical stability of the electrode plaque caused by the double needling of the needle felt. Improved electric loading capacity is therefore obtained for the fiber structure electrode plaque according to the invention, which has a smaller thickness than the plaques according to the known state of the art. The reason is that the stability of the electrode plaque does not suffer any premature damage due to the charging and discharging operation of the cell.

Other objects, advantages and novel features of the present invention will become apparent from the following detailed description of the invention when considered in conjunction with the accompanying drawings.

DETAILED DESCRIPTION OF THE DRAWINGS

Figure 1:
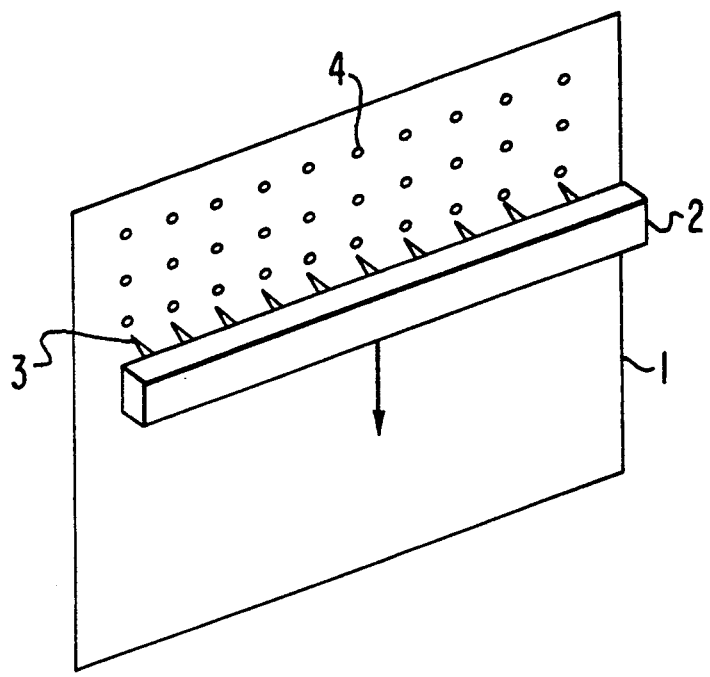
FIG. 1 illustrates schematically the process of needling a needle felt web in the manufacture of an electrode plaque according to the invention.

Referring to FIG. 1, there is shown a segment of needle felt 1, which is being needled by needle bar 2 having a series of needles 3 along the surface thereof. The needle bar is pressed repeatedly against the needle felt 1, thereby creating a series of punctures 4 in its surface. This needling process may be performed on one side at a time as illustrated in Figure 1, or simultaneously on both sides using two need bars disposed opposite each other on either side of the material (not shown). Also, in place of a needle bar as shown, a needle board bearing a matrix of needles may be used.

Figure 2:
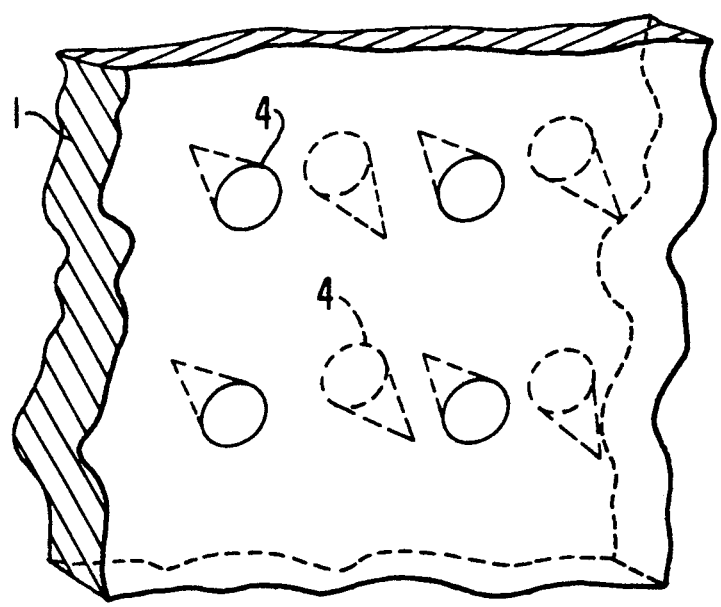
FIG. 2 is an enlarged broken away schematic depiction of a needle felt material which has been needled on both sides according to the invention.

FIG. 2 illustrates, in an enlarged schematic view, the effect of needling process, in which punctures 4 are made in both sides of needle felt 1. Needling of the material on both sides in this manner facilitates better saturation of the electrode plaque with the active mass, and therefore, better contact between the electrode plaque and the active mass.

Hereinafter, the invention is described in greater detail by means of the following examples:

EXAMPLE 1

A needle felt web made of polypropylene fibers was needled simultaneously on both sides. The polypropylene material in this case had a nominal thickness of 9.95 mm, a weight per unit area of 80 g/m$^2$, a thickness of the individual fibers of 15 μm, and a length of the staple fibers of 40 mm. The web was first activated in a known manner by means of an activating solution on a palladium tin base, and was subsequently chemically nickel-plated. The treated needle felt web was then rinsed with water and the rinsing water was pressed out of the pores of the needle felt web. Subsequently, the metallized needle felt web was cut into pieces, which were clamped into a plating frame and further galvanically nickel-plated in a conventional Watts-type nickel-plating solution containing nickel sulfate, nickel chloride and boric acid. The galvanic nickel plating was carried out at a solution temperature of approximately 55° C., and a pH-value of approximately 4.5 was maintained, specifically until the nickel coating on the needle felt piece measured 90 mg/cm$^2$ Subsequently, the galvanically nickel-plated needle felt pieces were rinsed with water, dried, cut by means of guillotine shears to a normal electrode format (10 cm × 10 cm), and shaped to a thickness of 0.75 mm by pressing (calender). Thereafter, a current tab was welded to each of the present electrode plaques, and those intended for the positive electrodes of nickel cadmium accumulators were filled with a nickel hydroxide paste. The filling quantity (dry condition) of nickel hydroxide amounted to approximately 1.2 g/cm$^3$ of the volume of the electrode plaque.

EXAMPLE 2

A needle felt web according to the data in Example 1 was also activated in the same manner with an activating solution on a palladium/tin base and chemically nickel-plated. The galvanic nickel-plating was also performed in the same manner until the nickel coating on the needle felt piece was 50 mg/cm$^2$. The needle felt pieces thus obtained were also cut again to a normal electrode format, and by means of pressing were shaped to a thickness of 0.5 mm. After the welding-on of the current tab, those electrode plaques intended for the negative electrodes of nickel cadmium accumulators were filled with a cadmium oxide paste. The filling quantity (dry condition) of cadmium oxide amounted to approximately 1.8 g/cm$^3$ of the volume of the electrode plaque.

EXAMPLE 3

Six positive electrodes, manufactured according to the preceding Example 1, and 12 negative electrodes, manufactured according to Example 2, were installed in a nickel/cadmium accumulator. The electrolyte was 8 molar with respect to KOH and 0.8 molar with respect to LiOH. With a nominal capacity of 12.5 A at I$_5$, a maximum current of 500 A could be obtained from the accumulator for a short time.

The advantages of the fiber structure electrode plaque according to the invention are, in particular, that it can be manufactured in a technically simple and cost-effective manner and the electrodes of an accumulator equipped with such a plaque have an increased electrode loading capacity during the operation. The plaque is saturated with the active mass to a considerable extent whereby an excellent contacting is also provided along the whole surface of the plaque.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A fiber structure electrode plaque for increased-capacity accumulators, comprising a needle felt web made of synthetic fibers which, after activation, is chemically metallized and reinforced by metal plating, wherein the needle felt web has a weight per unit area of between 50 and 150 g/$_{m2}$ and a porosity of 60 to 96%, the synthetic fibers of the needle felt have a diameter of 10 to 30 μm, and staple fibers thereof have a length of to 20 to 40 mm, the needle felt web is needled from both sides along its whole surface; and the nominal thickness of the needle felt web is from 0.5 to 1.0 mm.

2. A fiber structure electrode plaque according to claim 1, wherein the synthetic fibers of the needle felt web consist of one of: polyethylene, polypropylene, polyester, polyamide or aramide.

* * * * *